United States Patent

[11] 3,618,748

[72] Inventor Routhford J. Burkett
  Indio, Calif.
[21] Appl. No. 23,527
[22] Filed Mar. 11, 1970
[23] Division of Ser. No. 699,687, Jan. 22, 1968, Pat. No. 3,545,692.
[45] Patented Nov. 9, 1971
[73] Assignee Coachella Valley Organic Fertilizer Co.

[54] FEED AND GUIDANCE CONTROL APPARATUS FOR A TREE HOGGER UNIT
  2 Claims, 8 Drawing Figs.
[52] U.S. Cl. ................................. 198/213, 56/503
[51] Int. Cl. ........................................ B65g 33/06, B65g 65/06
[50] Field of Search ........................................... 198/9, 213, 104; 146/71; 144/2-21, 3-4; 241/101 M; 56/16, 1, 503

[56] References Cited
UNITED STATES PATENTS

| | | | |
|---|---|---|---|
| 2,795,314 | 6/1957 | Becker | 56/157 X |
| 2,155,422 | 4/1939 | Korsmo | 198/104 |
| 2,893,537 | 7/1959 | Krahn | 198/104 |
| 2,795,314 | 6/1957 | Becker | 198/104 |

Primary Examiner—Edward A. Sroka
Attorney—Warren, Rubin, Brucker & Chickering

ABSTRACT: The following disclosure describes an improved feed and guidance control for feeding tree parts to a masticator assembly which comprises a part of a tree hogger unit.
The feed apparatus includes a pair of spaced-apart rotatable drums having a series of blades thereon adapted, when said drums are rotated, to engage, lift and move tree parts between the drums. An essentially smooth-walled chute is provided between the drums and masticator assembly, converging toward the latter, and adapted to guide tree parts smoothly to the assembly. A member is also provided which is adjustably positioned with respect to the drums to deflect branches and other tree parts extending thereabove, and confine them to the area swept by the rotating drums.

INVENTOR.
Routhford J. Burkett
BY
Warren, Rubin, Brueker &
Chickering
Attorneys

FEED AND GUIDANCE CONTROL APPARATUS FOR A TREE HOGGER UNIT

This application is a division of application Ser. No. 699,687, filed Jan. 22, 1968, now U.S. Pat. No. 3,545,692.

The invention, for which the following represents a detailed disclosure, relates to tree hoggers capable of reducing entire trees to mulch-size chips, and more particularly to improvements in feed and guidance control apparatus for urging the trees into the masticator assembly which comprises a part of the tree hogger unit.

Tree removal operations usually involve a preliminary step of uprooting the tree. This may be accomplished by means of a bulldozer or other device having a comparable capability. The uprooted tree, is thus disposed on its side with a root ball of substantial diameter at one end of the tree trunk and a series of outwardly extending branches at the other end.

The tree hogger of the present invention, which is described generally in my copending application Ser. No. 699,687, filed concurrently herewith, embodies a heavy masticator drum which is disposed in shroud or housing and rotated at high speeds. The drum is provided with a series of sharp teeth on the surface thereof which chop away at the tree in small increments, reducing the same to mulch-sized chips. The chips are usable as a fertilizer, and by spraying an aerobic bacteria thereon, the decomposition thereof is accelerated.

The opening in the shroud which houses the masticator drum is relatively small so as to limit the volume of tree parts which may engage the wheel per unit time. It is necessary, therefore, that the tree parts be properly introduced to the masticator and fed thereto in a controlled manner so as to insure that the tree is completely reduced by the masticator without overloading or otherwise damaging the masticator drum or its power drive.

It is, therefore, an objective of the present invention to provide an improved feed and guidance control assembly for a tree hogger of the type described which positively engages the tree and feeds the same, in a controlled manner, directly to the throat of the masticator.

It is another object of the invention to provide apparatus for bending the branches reducing the cross-sectional area traversed thereby as the same approaches the throat of the masticator, thereby maintaining proper control over all portions of the tree, including the appendages, during feeding thereof, These and other objects and advantages of the invention will appear from the following detailed description of the invention, taken in conjunction with the drawings, wherein.

Figure 5:
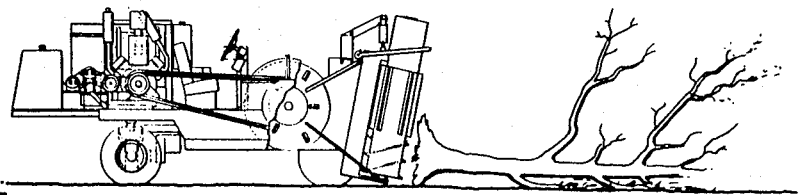
Figure 6:
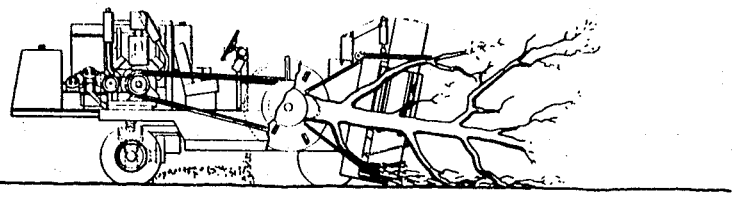
Figure 7:
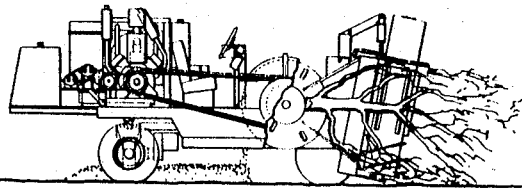
Figure 8:
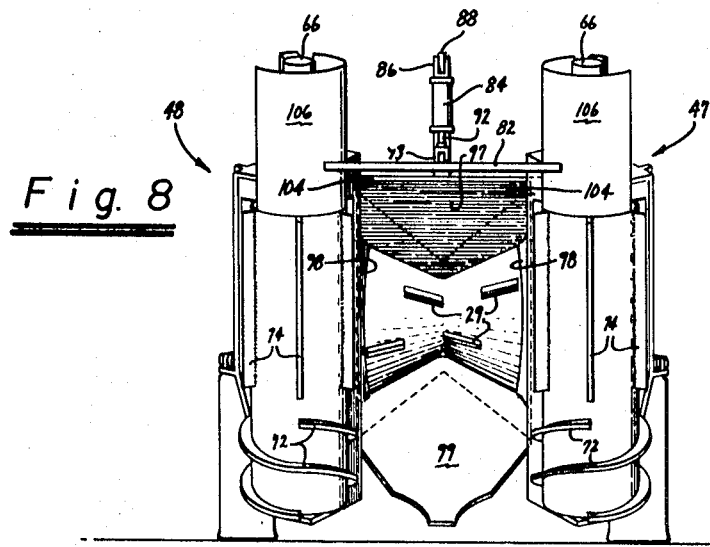

FIG. 5, 6, and 7 are schematic representations of the progressive feeding of a tree to the tree hogger;

FIG. 8 is a view looking into the throat of the masticator and illustrating the feed and control assembly as seen by the tree parts being fed thereby.

While the invention is susceptible of various modifications and alternative construction, a particular illustrative embodiment is set out in the drawings and will be described in detail hereinafter. It will be understood that the invention is not intended to be limited to the particular disclosed form, but rather to cover all modifications, alternative constructions, and equivalents falling within the spirit and scope of the invention as expressed in the appended claims.

In accordance with the present invention, a feed and control assembly is provided for use with a tree hogger and is adapted by means of pairs of unique bladed drums, and a novel system of deflector plates, to draw all parts of the tree, from the root ball to the tops of the branches, into a masticator assembly for reduction to mulch-size chips. The invention includes apparatus for reducing the cross-sectional area traversed by the tree, and particularly the branches thereof, as the same is passed through the drum and toward the relatively small throat of the masticator.

Figure 1:
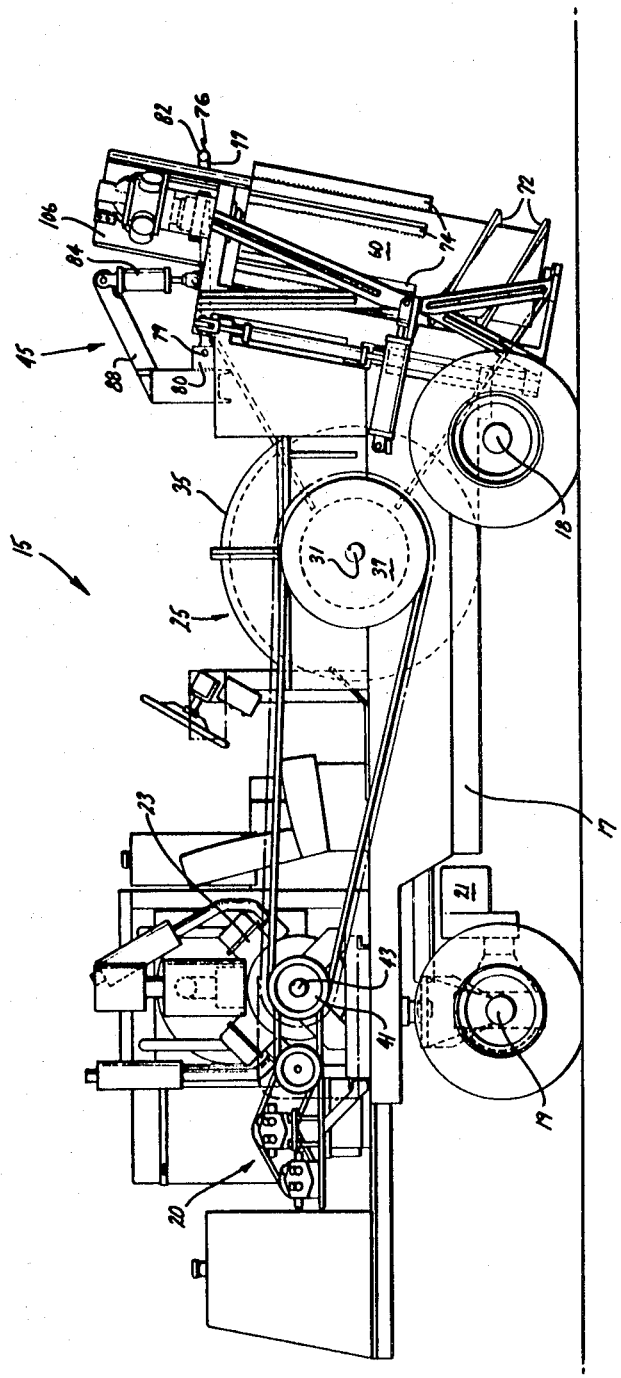
FIG. 1 is a side elevation of the tree hogger illustrating the position and certain details of the construction of the feed and control assembly of the present invention.

With particular reference now to the drawings, and initially to FIG. 1, an exemplary tree hogger unit of the type for which the present invention has particular, although not necessarily exclusive, utility is shown, and identified generally at 15. The tree hogger unit is mobile as shown, and comprises a chassis 17 which is rendered maneuverable by mounting the same on front and rear wheeled axles 18 and 19. The rear axle 19 is live and is driven by fluid motor and transmission assembly 21. An internal combustion engine 23, which may be either of the compression ignition or spark ignition type, is mounted on the chassis, and drives a masticator assembly indicated generally at 25, and fluid pumps 26, which supply the pressure to operate the device.

Figure 2:
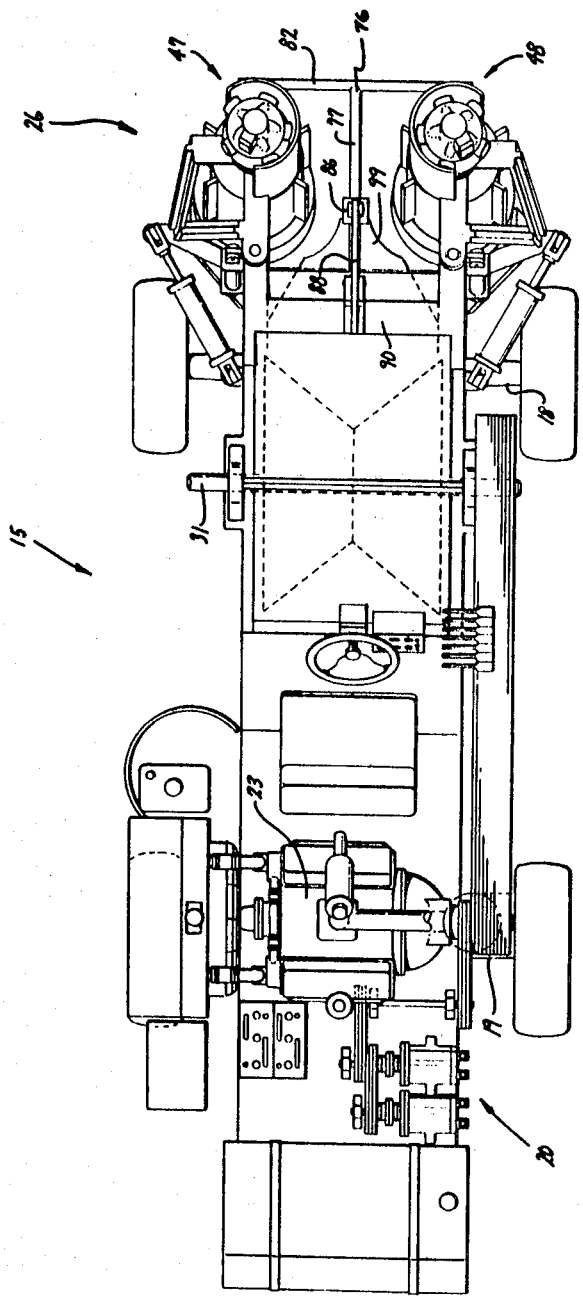
FIG. 2 is a top plan view of the tree hogger of FIG. 1 and illustrating additional features of the improved feed and control assembly.
Figure 4:
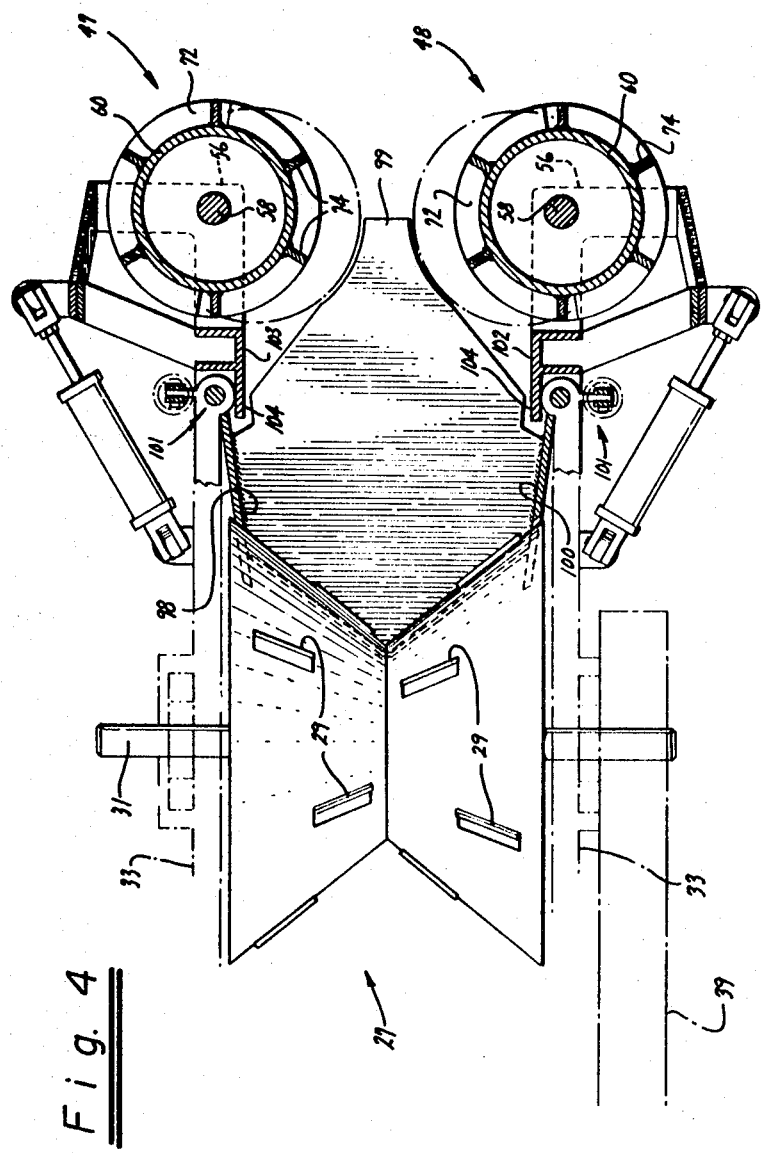
FIG. 4 is a section taken along lines 4—4 of FIG. 3.

As best seen in FIGS. 2 and 4, the masticator assembly comprises a drum 27, which in the illustrated case, is formed of a pair of converging truncated conic sections having teeth 29 formed on each. The drum is mounted on a shaft 31 which is supported in bearings in the sidewalls 33 of the assembly. A shroud 35 (see FIG. 1) conforms to the general profile of the masticator drum, providing a suitable space between the surface of the drum and the shroud for the passage of material chipped from the tree being fed thereto.

A drive pulley 37 is keyed or otherwise fastened to the shaft 31 and a series of parallel "V" belts 39 interconnect the pulley with a pulley 41 driven by the crankshaft 43 of the engine.

Again referring to FIG. 1, there is provided, in accordance with the invention, an improved feed and guidance control assembly indicated generally at 45 disposed on the chassis immediately forward of, and in alignment with, the masticator assembly 25.

A principal function of the assembly 45 is to urge the entire tree into the masticator at a controlled rate so as to avoid damage or overloading to any of the apparatus. Motive force is applied to the tree parts, in keeping with the invention, by means of a pair of drums 47 and 48, each of which is rotatably mounted in bearing relation to a supporting frame. The frames are substantially identical in the assembly of components, and are mirror images of one another since one functions on the left and the other on the right of the path between them leading to the throat of the masticator.

Figure 3:
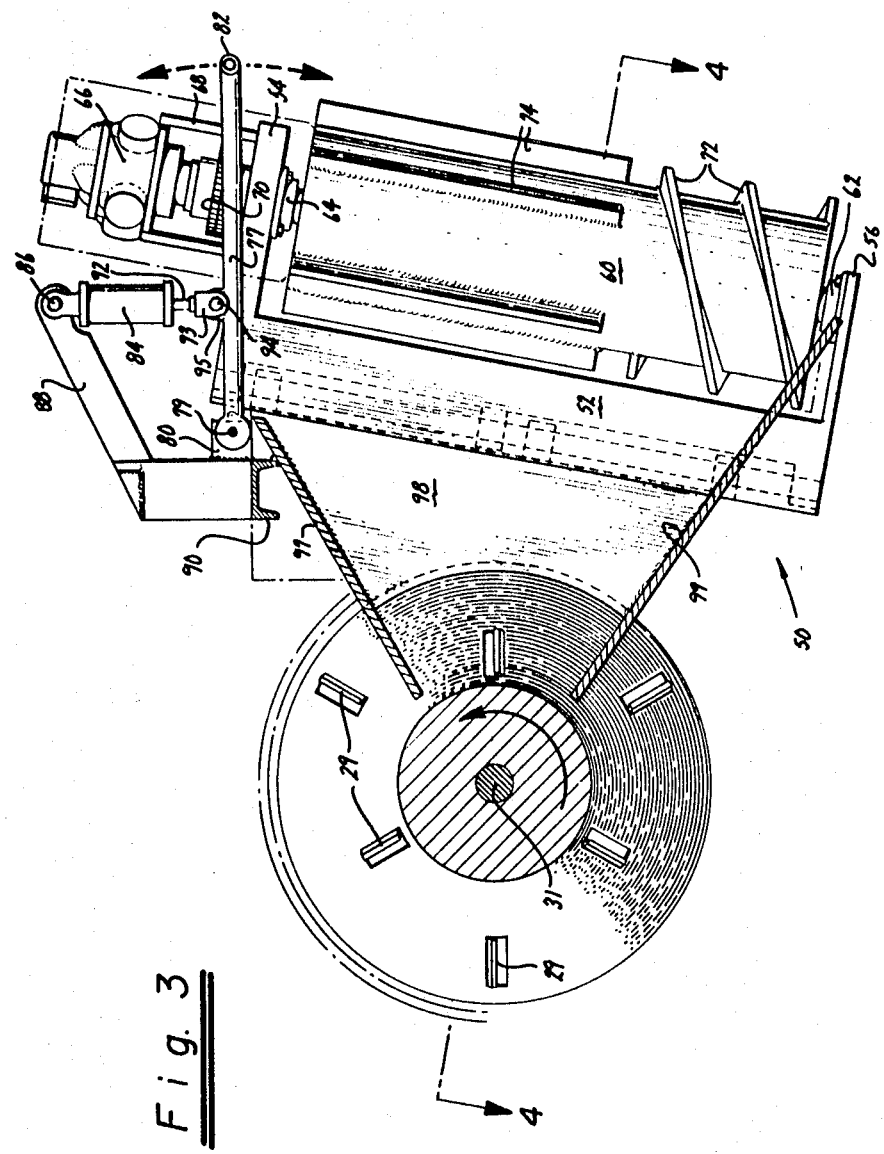
FIG. 3 is an enlarged, partially fragmented and sectioned view of the feed and control assembly of the present invention, and illustrating it in relation to the masticator drum.

Referring to FIGS. 3 and 4, an exemplary one of the frames, indicated generally at 50, comprises a main body member 52 having top and bottom transverse supports 54 and 56 respectively. Each frame is constructed of strong steel members in order to withstand the loading which occurs by operation of the drums on the tree.

The drums, as may be seen in FIG. 4, are supported by axially disposed longitudinal shafts 58 rigidly secured in a cylindrical main body portion 60. The shaft extends beyond the ends of the drum and the bottom portion thereof is journaled in a thrust bearing 62 mounted on the lower transverse member 56 of the frame. The upper extension of the shaft passes through the upper transverse member 54 where it is journaled in a bearing, the bearing cap of which, 64, is seen in FIG. 3. As in the case of the frames, the drums are of heavy construction, and the bearings are disposed both top and bottom to prevent deflection of the drums during operation. The drums, thus journaled, rotate on a predisposed axis and may be manipulated, by means of the frame, to perform the intended operation. It will be noted that the drum shafts are not vertical relative to the ground, but are positioned at an angle of about 75°. This forward tilting enhances the pickup capability of the drums, which do not extend all the way to the ground.

The drums, which are oppositely rotated in order to draw the tree to the masticator, are power driven by fluid motors 66 which are supported above and rigidly connected to the top of the transverse member 54, by plates 68. Because of the severity of the loading on the drums, which causes some shaft deflection, and also because of some misalignment resulting from construction, the motors are connected to the shafts 56 by means of a suitable flexible coupling arrangement 70. While any convenient coupling may be employed, in the illustrated case a link chain coupling, preferably having a shear pin, is used. The shear pin is constructed to protect the fluid motor from overload by breaking at a predetermined load.

With particular reference now to FIGS. 3, 4, and FIGS. 5 through 7, it will be seen that the masticator assembly throat may be as high as 20 inches off the ground. A tree, which has been felled, and is about to be reduced by the hogger, is supported on the ground by its root ball, and its branches. The drums, in order to permit proper support, are disposed above the ground, and thus must raise the tree before feeding the same to the masticator. Accordingly, and in keeping with the invention, the drums are provided with blades which are effective to initially lift the tree from the ground and feed the same rearwardly to a deflector section which guides the tree smoothly to the masticator drum 27.

The desired lift and feed operation is accomplished the periphery of each of the cylinders 60, and extends from the bottom thereof upwardly, as seen in FIG. 3, for a distance representing approximately one-third of the axial length of the drum. The pitch of the spiral is the same on both of the drums 47 and 48, but because of the opposite rotation of the drums, is generated in opposite directions. In FIGS. 4 and 8, it will be seen that drum 47 is intended to rotate in a clockwise direction, while drum 48 is intended to rotate in a counterclockwise direction. Accordingly, as the drums are urged into engagement with the root ball, (that portion of the tree being the first to be fed to the device), rotation of the drums will result in their acting in unison to generate a lifting force on the root ball.

Once the root ball has been elevated to the approximate height of the masticator, it is directed rearwardly by the action of the rotating drums, into the throat itself. This is accomplished by a series of axially extending radially projecting blades 74. These blades, as will be evident from FIG. 4, bite into the root ball and successive tree parts, and act like a series of gears, driving the tree parts toward the masticator. As may be seen in FIG. 3, these blades extend from a point above the helical blade 72 to the top of the drum, cylinder 60. Accordingly, irrespective of the size of the root ball, it is positively engaged over a substantial portion thereof.

The root ball and trunk of a tree are relatively compact, although their diameters may be substantial. The branches of a tree, however, extend outwardly in random fashion from the main trunk and traverse, in the usual case, a substantial cross-sectional area. If the desirable objective of consuming the entire tree in the hogger is to be achieved, it is necessary to reduce the cross-sectional area traversed by the branches, and confine the branches generally, in order that they might be engaged by the drums and fed to the relatively smaller throat of the masticator assembly.

With the tree in the felled position, a portion of the branches will be compressed against the ground by the weight of the trunk. The ground, therefore, acts as a check against the random downward spread of the branches, and actually assists in feeding those branches past the drums. Those branches which extend to either side of the trunk will be positively engaged by the rotating drums 47 and 48 and thereby compressed and fed into the masticator. The invention also provides for the restriction or confinement of the branches extending upwardly. This is achieved by the provision of deflector means comprising a compression ram arrangement having a power adjustment which effectively deflects upwardly extending branches downwardly to a position where they are readily engaged by the blades 74 of the drum.

For this purpose, a T-bar deflector member 76 is provided, having an elongated support bar 77 pivotally mounted about a pin 79 disposed rearwardly of the drums and grounded to the frame by a boss 80. The leading end of the bar attaches to the midportion of a deflector bar 82 which is positioned ahead of the drums, as may be seen in FIG. 3, and extends from side to side so that the ends thereof always overlap the drums in their maximum spread position. The bar 77 being pivoted about the pin 79 permits a swinging action of the bar 82 in an arcuate path in front of the drums permitting the same to be positioned relative to the top of blades 74. Accordingly, branches extending upwardly from the trunk of the tree passing through the drums will be biased downwardly to at least the level of the blades 74 where they may be grasped thereby and fed to the masticator.

In order to prevent the crossmember from being deflected out of the way by the reaction force of branches, a fluid motor 84 is provided to positively position the bar 82 as desired by the operator. The fluid motor is suspended by a pivot pin 86 from a cantilever member 88 which is rigidly secured to a channel beam 90 forming a part of the main frame of the device. A ram 92 having a clevis 93 at the free end thereof connects, by means of a pin 94, to a bass 95 formed on the bar 77. Actuation of the fluid motor will, therefore, cause the crossmember 82 to be properly positioned, and held in that position against the action of branches moving under the crossmember.

The T-bar deflector arrangement permits proper compacting of the branches without concern that a branch might escape and clog the driver. Since the drums may be a substantial distance apart the crossmember covers the entire distance and no branch is allowed to pass without being properly confined.

Since, as may be seen in FIGS. 3 and 4, the throat of the masticator is slightly greater than the size of the root ball, and is thus reduced in comparison to the area swept by the drums 47 and 48. It is desirable, therefore, in order to assure proper feeding of the tree to the masticator, that the reduction be smooth and graded in terms of the cross-sectional area which it traverses. To this end, the throat of the masticator is defined by deflector guide means which defines a chute or channel, the limits of which are determined by a group of interconnected deflector plates 97, 98, 99 and 100. The top plate 97 and bottom plate 99 as may be seen in FIGS. 3 and 8, converge from a position adjacent the drums toward the opening in the housing of the masticator, It will be noted that the bottom plate 99 extends downwardly and between the drums. In order to prevent the plate from interfering with the free pivotal movement of the drums, the plate is contoured to permit the drums to move together with the plate between them. Thus, the lower portion thereof is reduced to be disposed between the drums, a midportion has defining side edges which diverge from the lower portion, and an upper portion converges to the masticator. The sideplates 98 and 100, which flank the masticator assembly, converge toward the throat from a position immediately adjacent the main frame members 52 and the edges thereof are welded or otherwise fastened adjacent to the edges of plates 97 and 99 to form a closed chute having a substantially uninterrupted sidewall.

As may be seen in FIG. 4, the drum support frame 50 are pivotable about hinge arrangement 101 to permit adjustment of the position of the frames toward and away from one another. In order to maintain the path of the tree from the drums to the masticator as smooth as possible in the direction of flow of the tree, support frame deflector plates 102 and 103 are disposed on the frame and movable therewith. These plates have an overlapping portion 104 which covers the hinge 101 and thus presents a substantially continuous wall, as seen in FIG. 8, with the plates 98 and 100 irrespective of the position of the frames about the hinge. Accordingly, there are no breaks or openings which would permit a branch to catch and hang up in the device. Further, in keeping with the desirability of eliminating hangup of branches in the machine, which would inhibit smooth feeding thereof, shrouds 106 are formed about the fluid motors on the frame, and present a relatively smooth guide surface to tree parts passing through the drums.

Still referring to FIG. 4, it will be noted permits the drums to be moved inwardly and outwardly without interference from the plate 99. The top plate 97 does not extend all the way to the drums, and is not, therefore, sculptured in this manner. However, should it be desired to extend the plate, the plate may be modified in order to prevent the drums to operate without interference. FIGS. 5 through 7 illustrate, in a series of progressive steps, the manner in which a tree is lifted by the feed and control assembly, and fed to the masticator. The action of the T-bar member is likewise illustrated. Thus it is seen that the present invention provides apparatus which smoothly and positively feeds and guides tree parts to a masticator functioning as part of a tree hogger unit.

I claim:

1. In a tree hogger having a chassis and masticator supported thereon, the improvement comprising:

a pair of feed drums;

means supporting said drums for rotation about generally vertically disposed substantially parallel axes and in horizontally spaced relation for receiving tree parts therebetween, said means providing movement of said drums toward and away from each other for accommodating tree parts of different sizes;

power means connected for simultaneously rotating said drums in opposite directions of rotation for displacing tree parts engaged thereby to the masticator;

a spiral blade mounted on each of said drums adjacent the lower end thereof and cofunctioning with the rotation of said drums for elevating tree parts engaged thereby; and a plurality of feed blades mounted on each of said drums and extending radially therefrom, said feed blades extending longitudinally along said drums from above the uppermost point of said spiral blades and cofunctioning with the rotation of said drums to drive tree parts through the space between said drums and in the direction of the masticator.

2. A tree hogger as defined in claim 1, each of said spiral blades extending spirally from the lower end of each drum to a point less than halfway to the upper end of said drum; and said forward blades extending longitudinally from adjacent the uppermost point of said spiral blades to adjacent the upper ends of said drums.

* * * * *

UNITED STATES PATENT OFFICE
CERTIFICATE OF CORRECTION

Patent No. 3,618,748                     Dated November 9, 1971

Inventor(s)  Routhford J. Burkett

It is certified that error appears in the above-identified patent and that said Letters Patent are hereby corrected as shown below:

Column 2, line 74, after "driven by", insert --means of individual--.

Column 3, line 4, change "56" to --58--.

Column 3, line 22, after "accomplished", insert --by the provision of a spiral blade 72 which is generated about--.

Column 3, line 39, change "itself" to --thereof--.

Column 4, line 20, change "bass" to --boss--.

Column 5, line 1, after "noted", insert --that the bottom plate 99 has a reduced forward end portion which--.

Column 1, line 18, change "699,687" to --699,655--.

Signed and sealed this 16th day of May 1972.

(SEAL)
Attest:

EDWARD M. FLETCHER, JR.
Attesting Officer

ROBERT GOTTSCHALK
Commissioner of Patents